United States Patent [19]

Malonda

[11] 3,911,586
[45] Oct. 14, 1975

[54] PRECISION CONTROL APPARATUS
[75] Inventor: Alphonse Malonda, Bretigny-sur-Orge, France
[73] Assignee: Bretigny Rectification, Bretigny-sur-Orge, France
[22] Filed: June 27, 1973
[21] Appl. No.: 374,241

[30] Foreign Application Priority Data
June 29, 1972 France .............................. 72.23567
May 15, 1973 France .............................. 73.17481

[52] U.S. Cl. ............ 33/174 M; 33/172 R; 33/174 Q
[51] Int. Cl.² ....................... G01B 5/28; G01B 5/20
[58] Field of Search .......... 33/174 R, 174 Q, 174 H, 33/174 M, 172 R; 308/4 R, 6 R, 239

[56] References Cited
UNITED STATES PATENTS

| | | | |
|---|---|---|---|
| 3,047,956 | 8/1962 | German............................. | 33/174 M |
| 3,273,252 | 9/1966 | Bunge .............................. | 33/172 R |
| 3,387,374 | 6/1968 | Gordon ............................ | 33/174 M |
| 3,570,132 | 3/1971 | Guzzo .............................. | 33/174 M |

FOREIGN PATENTS OR APPLICATIONS
256,261  8/1948  Switzerland....................... 33/174 Q

OTHER PUBLICATIONS
Blake, M. P., "Three-Point Gage for Straightness Lines Up Machine Frames", *American Machinist*, Apr. 23, 1956, p. 140.

*Primary Examiner*—Richard E. Aegerter
*Assistant Examiner*—Richard R. Stearns

[57] ABSTRACT

The present invention relates to a control device for checking and measuring the accuracy of machined parts, and especially the flatness of surfaces and the squareness of perpendicular planes, said device comprising a rigid body equipped with at least one direct-reading measuring instrument such as a comparator or the like, associated with a feeler device, said rigid body being constituted by a bar made in one single piece with two end-plugs of the same section, greater than that of said bar, the bar and the plugs being strictly coaxial, while the outer faces of said plugs are precisely parallel and perpendicular to supporting zones formed on the edges of said plugs, said supporting zones being precisely parallel to the axis of said rigid body.

9 Claims, 14 Drawing Figures

PRECISION CONTROL APPARATUS

The present invention relates to a control apparatus ensuring the conformity of machined parts with a configuration or shape which it is desired to give them; in particular, this apparatus must make it possible to check the flatness of the surfaces and also the squaring of planes perpendicular to each other.

This apparatus is more especially intended to give an immediate visual indication of possible faults in parts to be checked.

A certain number of instruments are already at the disposal of the operator who has to shape parts of high precision; thus, he has available the conventional flat square for checking the perpendicularity of the faces; however, this instrument does not give a figured indication of the differences in dimensions which can be revealed by the square. A more improved instrument has also been put at the operator's disposal, this instrument being generally known as a "cylindrical" square. This cylindrical square permits in theory measurements to be made much more accurately, since it is equipped with a comparator.

However, these more improved instruments are fragile and may get out of order very easily. In addition, they are very expensive and difficult to use. Under these conditions, it will be understood that this kind of precision instrument cannot be located at the working station of the operator, where it would be liable to sustain damage. This instrument may therefore be described in reality as more or less of the laboratory type.

Furthermore, in order to permit effective checks to be made, this cylindrical square must itself be checked by means of what may appropriately be termed a cylindrical column.

Under these conditions, it is clear that this type of instrument is not of any real help to operators.

The present invention has for its object to propose a control device which has the advantages of an instrument of high precision without having either the fragility or the difficulty of use of existing instruments. In addition, the device according to the invention is of very low cost and can therefore be placed at the disposal of all operators who have to use it directly at their working station.

Furthermore, amongst the advantages of the device according to the invention, there may be noted its universality, which means that it can provide at the same time:

Checking the flatness of surfaces;
Checking the squareness of one or more planes at the same time;
Checking the thickness on a number of separate planes;
Use of the device as a high-precision block.

According to the invention, the control device is constituted by a rigid body equipped with at least one direct-reading measuring instrument, this device being characterized in that the body is constituted by a bar made in one single piece with two end plugs of identical section, the section of the plugs being greater than that of the bar. In addition, the bar and the plug are strictly coaxial, the external faces of the plugs being strictly parallel and perpendicular to supporting zones formed on the edges of the plugs, these supporting zones being themselves strictly parallel to the axis of the rigid body.

The fact that the rigid body is made in one single piece is an important feature of the invention, since in this way it is possible to obtain unequalled accuracy in the parallelism and the perpendicularity of the faces and supporting zones. In this way, the errors due to inevitable tolerances used in the manufacture of an apparatus made of several parts are avoided.

In fact, with the device of the invention, the roughing-out and finishing of the various bearing surfaces may be carried out respectively on one machine without necessitating any handling and by carrying out all the operations from the general axis of the device. In this way, an apparatus of very great accuracy can be produced in a relatively simple manner.

Also according to the invention, the edges of the end-plugs can be absolutely cylindrical, or alternatively they may have a flat portion serving as a supporting zone.

In addition, according to one form of embodiment of the invention, the measuring instrument may be arranged at fixed positions on the bar, and for that purpose, the bar is provided with a series of orifices formed at intervals and intended to receive the said measuring instrument, which is locked in position by any appropriate means, for example by screws.

According to another form of embodiment which permits of greater flexibility in use, the measuring instrument is made movable over the whole length of the bar, this mobility thus ensuring an accurate modification of the position of the instrument as a function of the parts to be checked.

To this end, according to the invention, the external surface of the bar is strictly coaxial with the plugs and it is ground so as to serve as a slide for a moving ring equipped with a measuring instrument.

Although the ring may be designed in such manner that it is in direct contact by its internal face against the bar, in a preferred form of construction, the internal dimensions of the ring will be greater than the dimensions of the transverse section of the bar, removable shoes with a low coefficient of friction being provided in the inner face of the ring. These shoes, which are intended to bear against the bar can thus be easily changed when they are worn. These shoes will preferably be made of a plastic material, in particular such as the material sold commercially under the name of ERTALON.

In order to ensure good concentricity of the ring and the bar, at least one of the shoes will be mounted movable radially in the ring, a spring system with adjustable tension urging it towards the axis of the ring. On the other hand, the other shoes will be fixed in the ring.

The ring further comprises a ring mounted in a radially movable manner inside an internal groove, this ring being fixed for rotation with respect to the first ring. The second ring is rigidly fixed to a feeler extending radially and in a slidable manner towards the exterior through a first orifice in the first ring, and this feeler is aligned with the rod of a measuring instrument fixed radially in a second orifice of the first ring, diametrically opposite to the first orifice. The rod of the measuring instrument is supported on the outer surface of the second ring. It will be understood that in this way, any movement of the feeler causes a movement of the second ring and therefore of the rod of the measuring instrument which registers the variations of shape of the parts detected by the feeler.

The second ring is preferably guided in its movement by guiding columns to which it is fixed and which slide in bores formed in the first ring, the said columns cooperating with springs acting on the second ring in a pre-determined radial direction corresponding to the outgoing position of the feeler.

Finally, in order to permit easy assembly and dismantling of the first and second rings on the control device, the latter are preferably made in two parts fixed to each other after assembly by means of bolts, for example.

There will now be described, by way of nonlimitative example, two forms of embodiment of the invention, reference being made to the accompanying drawings, in which.

The device according to the invention is made of a special steel of very high quality and has been subjected to a heat treatment so as to give it a high hardness factor, this heat treatment being followed by successive stabilization phases in order to prevent any subsequent deformation.

As a general rule, the device is roughed-out on a lathe from a cylindrical rod. When finished, the device thus has a portion of small diameter or bar 1, terminating in two plugs 2 and 3. The outer faces 4 and 5 of the plugs are perfectly smooth and parallel to each other. This can be effected in a particularly easy manner by machining the part on a lathe and by grinding it; there is thus obtained an absolutely accurate axis X–X' of the device. Furthermore, there can be seen at 6 in FIG. 1 the centering cavities drilled in the faces of the plugs and in which were placed the points of the lathe headstocks.

Figure 1:
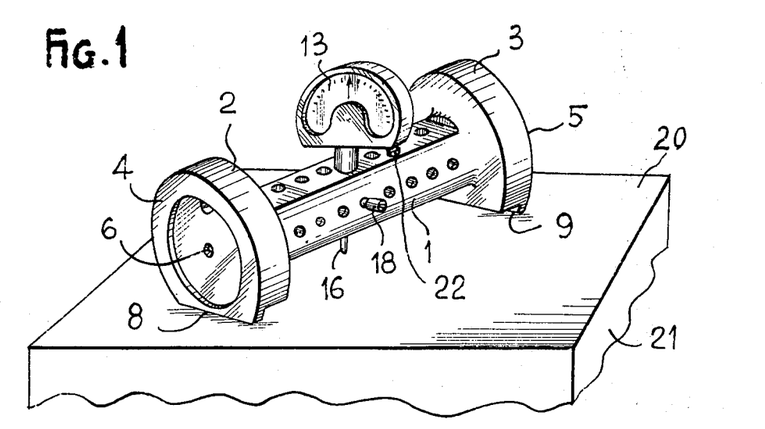
FIG. 1 is a perspective view of a device according to a first form of embodiment of the invention, arranged on a horizontal surface.
Figure 2:
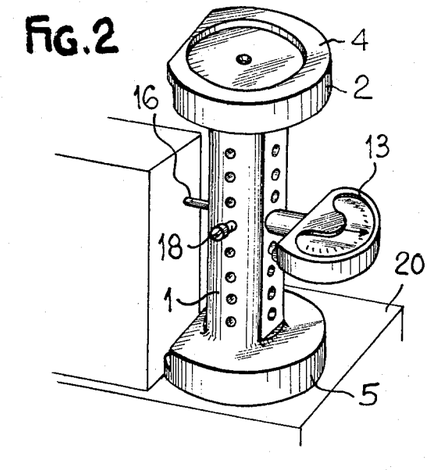
FIG. 2 shows the same device in a square-checking position.

It will be observed that, as clearly shown in FIG. 1, in order to reduce the bearing surfaces 4 and 5 as much as possible, the central portions of the plugs on their outer faces have been advantageously recessed at 7, which means that the bearing surfaces 4 and 5 simply have the form of rings.

In the form of embodiment shown in FIGS. 1 to 9, which will be described in more detail below, the periphery of the plugs 2 and 3 has also been machined in order to obtain horizontal bearing surfaces 8 and 9 which are strictly perpendicular to the vertical faces 4 and 5.

In this case also, in order to avoid the formation of defects, it was desired to have available bearing surfaces 8 and 9 which were as small as possible, and for that reason the plugs have a shouldered portion 10–11 (see FIG. 3) which does not bear against the supporting surface.

The bar 1 is pierced with a series of orifices 12, the axes of which extend practically perpendicularly to the plane defined by the bearing surfaces 8 and 9. These orifices 12 permit the introduction of measuring instruments, and in particular of a comparator 13 of standard type. Given that a series of orifices 12 is available, it will be understood that in the case where only a single comparator is used, it would be possible to vary its position along the length of the bar 1, and in the case where it is necessary to use a number of comparators, these can be arranged without any difficulty.

Figure 3:
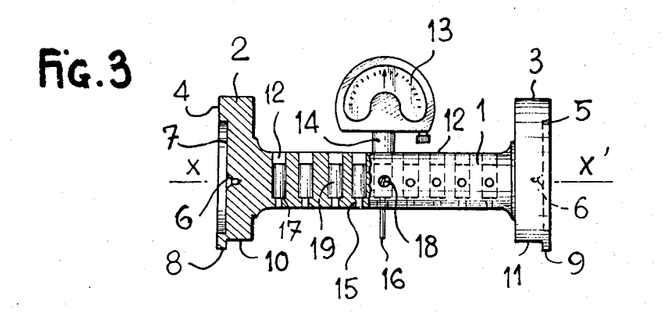
FIG. 3 is a view in elevation with a partial axial section of the device shown in FIG. 1.

As can be seen particularly from FIG. 3, the orifices 12 have an upper part of large diameter in which is engaged the neck 14 of the comparator, and a lower part 15 of smaller diameter, permitting the passage of the feeler rod 16 of the comparator. The shoulder 17 of the orifices 12 always enable the comparators to be suitably positioned.

Figure 4:
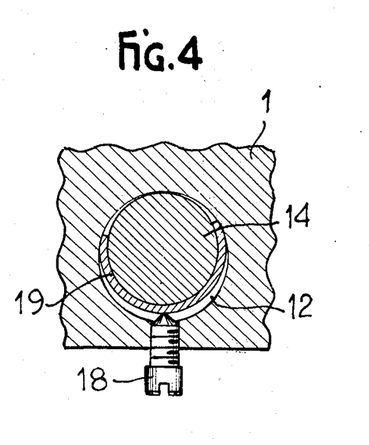
FIG. 4 is a detail view to a larger scale, showing the locking system for a comparator in the device.

The locking of the comparators in position is obtained by means of screws 18 engaged at right angles to the orifices 12 and which are supported on sleeves 19 located inside the orifices 12 and partly enclosing the neck 14 of the comparator.

In order to utilize the apparatus according to the invention, the comparator 13 is first of all adjusted with respect to a horizontal plane. To this end, as shown in FIG. 1, the apparatus is placed so that its bearing surfaces 8 and 9 are in perfect contact with the upper surface 20 of a surface-plate 21. By operating the re-setting knob 22 of the comparator 13, its needle is adjusted to indicate zero in this position of reference. It will be understood that the flatness of any machined part may be checked by placing the apparatus on the surface to be checked, in the same position as in FIG. 1, and moving it over this surface. The deflection of the comparator needle to the right or left of zero enables the defects of flatness of the surface to be detected.

Figure 5:
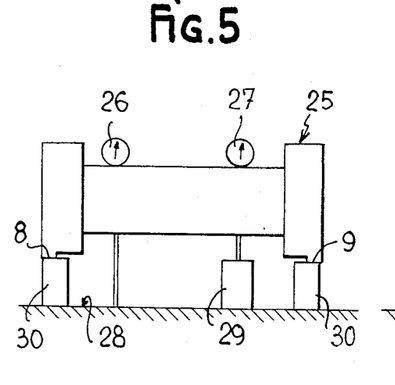
FIGS. 5, 6 and 7 show the apparatus of the invention carrying out various checks on horizontal planes.
Figure 6:
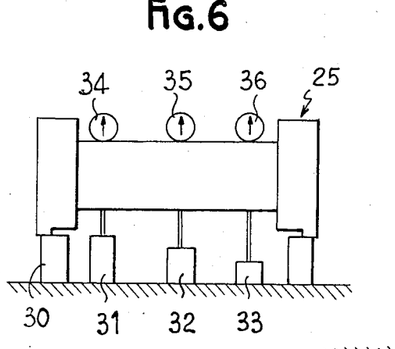
Figure 7:
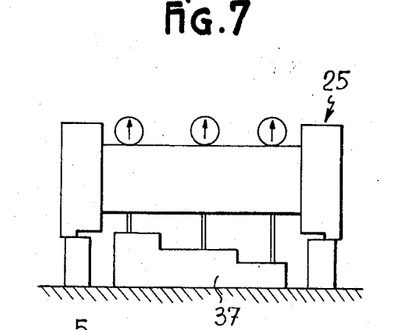

As can be seen from FIGS. 5, 6 and 7, the apparatus also permits simultaneous checking of the parallelism of separate parts of different heights. In this connection it should be stated that the apparatus according to the invention makes it possible to carry out checking operations on very delicate parts. In fact, it is the control device itself which can be moved in order to carry out these measurements; the part to be checked may remain stationary without being disturbed by any contact.

Thus, in FIG. 5, the apparatus generally indicated by the reference 25 may comprise two comparators 26 and 27, the comparator 26 being supported on a reference surface 28, while the comparator 27 is supported on the upper face of a part 29 to be checked. In this case, the bearing surfaces 8 and 9 of the apparatus 25 are supported on a frame or thickness blocks 30. By virtue of the arrangement shown in FIG. 5, the height of the part 29 can be measured with very great accuracy and its flatness with respect to the reference surface 28 can be checked.

FIG. 6 shows another case fairly similar, in which the flatness of three parts 31, 32 and 33 is simultaneously measured while checking their dimensions. In this case, the apparatus is provided with three comparators 34, 35 and 36.

In FIG. 7, there has been shown the same apparatus as in FIG. 6, the device enabling the flatness and the dimensions to be checked of a single part 37 which has different heights of planes.

Figure 8:
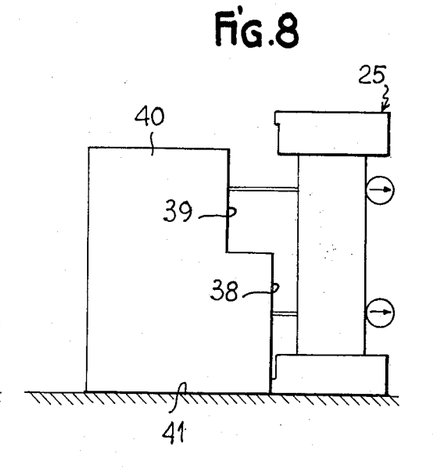
FIG. 8 shows the device in a position for checking squareness.
Figure 9:
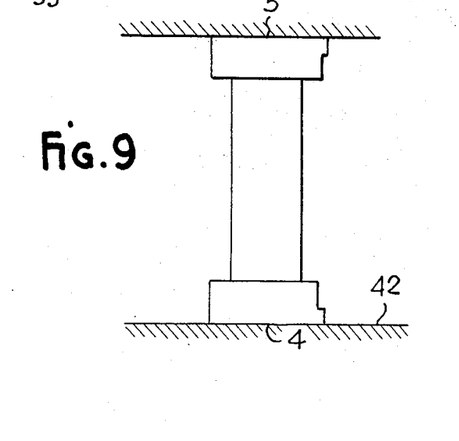
FIG. 9 shows the device according to the invention employed in the manner of a high-precision block.

Finally, as can be seen from FIG. 8, the apparatus 25 according to the invention permits the checking of the perpendicularity of different planes 38 and 39 of a single part 40 with one reference face 41 of this latter. In this case it is only necessary to provide as many comparators as there are planes to be checked, for example two in the example shown.

Finally, it will be noted that the apparatus of the invention may be utilized as a standard block of great height. In fact, it will be understood that if the apparatus is arranged in the position shown in FIG. 9, that is to say in such manner that one of its faces 4 rests on a reference plane 42, the face 5 being perfectly parallel to the face 4 and the distance between the faces 4 and 5 being determined with a tolerance of 0.005 mm., there is obtained at the level of the face 5 a supporting plane, the height of which with respect to the reference plane 42 is perfectly well known, these two planes being also perfectly parallel.

The robust nature of the device according to the invention makes its use possible, not only in a metrology service, but also in the tooling and manufacturing workshops. By virtue of its self-calibration, it makes it possible to avoid any recourse to the control services in the laboratory.

In the form of embodiment shown in FIGS. 10 to 14, the apparatus is identical in general design with that of FIGS. 1 to 9, and the same reference numbers have been retained to represent corresponding parts.

Figure 10:
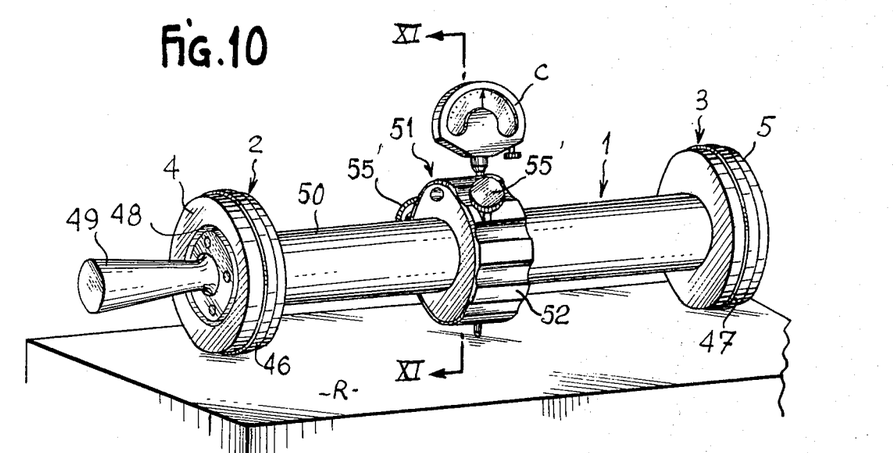
FIG. 10 is a perspective view of a device according to a second form of embodiment of the invention.

In this form of embodiment, the outer faces 4 and 5 of the plugs are trued and ground so as to be perfectly parallel. On the other hand, the edges of the plugs are not provided with any flat surface, but cylindrical bearing surfaces 46 and 47 (reduced in the example shown to rings of small width projecting with respect to the remainder of the cylindrical surface) which are also ground, and the generator lines of which are strictly perpendicular to the faces 4 and 5 of the plugs.

Furthermore, as can be seen from FIG. 10, the external faces 4 and 5 preferably have a central portion 48 in depression, so that the flat bearing surfaces are reduced to annular surfaces. This central portion 48 can be utilized for fixing, possibly in a removable manner, a handle 49 for handling the apparatus. This handle is preferably made of insulating material, so that the apparatus is not subjected to the local variations in temperature which might be caused by a user gripping the device in a zone used for the checking tests. In this way, there are also avoided the risks of soiling or scratching the ground zones of the apparatus.

Naturally, although a single handle is necessary for the manipulation of the device, if so desired and depending on the use of the apparatus, another handle could be provided at the other extremity of the apparatus.

The central cylindrical bar is also ground over its entire outer surface 50 and it carries in a slidable manner a moving system indicated generally at 51 and on which is mounted at least part of a measuring instrument. It will immediately be clear that the moving system may be displaced along the bar and positioned at any desired point in a very precise manner, which enables parts of any size to be checked.

A more precise description will now be given of the structure of the system 51 with reference to FIGS. 11 to 14.

The system comprises a ring 52 which, in the example shown, is made in two parts 53, 54, fixed to each other by screws 55. The ring is provided advantageously at the exterior with two operating knobs 55' of insulating material enabling the moving system to be easily displaced and without transmitting the heat of the hands to the metallic parts. The internal diameter 56 of the ring is slightly greater than the diameter of the bar 1 and the ring is in easy frictional contact with the bar through the intermediary of slide-shoes 57, 58, 59 which, in the example shown, are arranged at 120° from each other. The shoes 57 and 58, housed in corresponding cavities in the portion 53 of the ring, are fixed by screws 60 so that they can be removed and replaced if so required. The shoes have the approximate shape of a parallelepiped with a concave outer face in a portion of cylinder centered on the axis of the bar 1.

On the other hand, the shoe 59, housed in a blind cavity 61 of the portion 54 of the ring is constituted by two cylindrical fillets free to rotate about their axis and pressed into contact on the one hand with the wall of the cavity 61, and on the other hand with the outer surface 50 of the bar by a pressure system constituted by a rod 62 terminating in a conical head 63 inserted between the two fillets 59, this rod being freely mounted in a hole 64 of an adjusting screw 65 engaged in a threaded orifice 66 passing radially through the portion 54 of the ring. Between the screw 65 and the conical head 63 extends a spring 67 which pushes the fillets 59 into contact with the bar. The adjusting screw 65 enables the pressure applied by the shoes on the bar to be modified so as to make the displacement of the ring on the bar more or less easy. The shoes 57, 58 and 59 are preferably made of plastic material and for example, of a material sold commercially under the name ERTA-LON.

Figure 11:
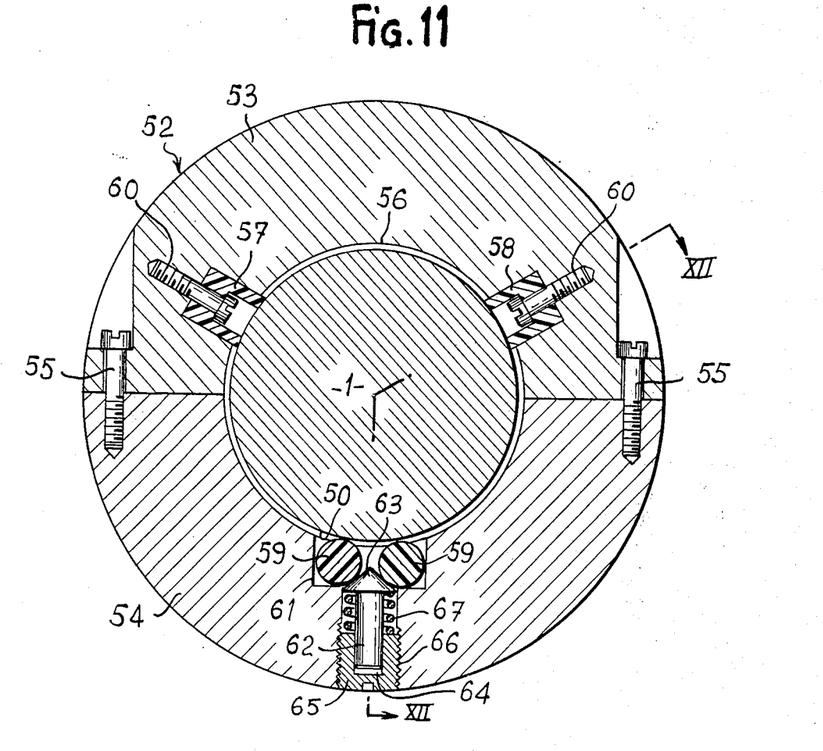
FIG. 11 is a view in cross-section to a larger scale taken along the line XI—XI of the device shown in FIG. 10.
Figures 12, 14:
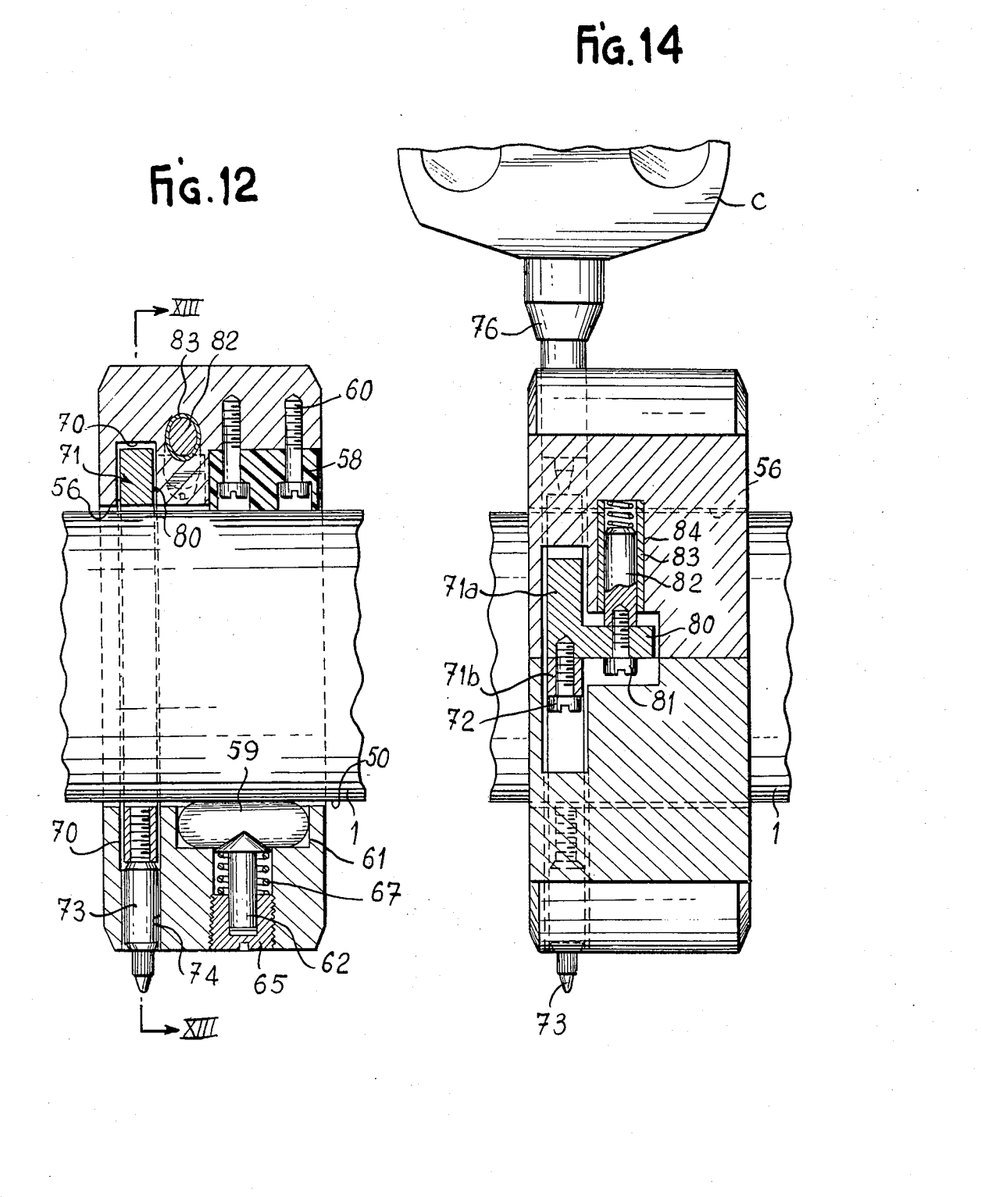
FIGS. 12, 13 and 14 are views in cross-section taken along the lines XII—XII, XIII—XIII and XIV—XIV of FIGS. 11, 12 and 13 respectively.
Figure 13:
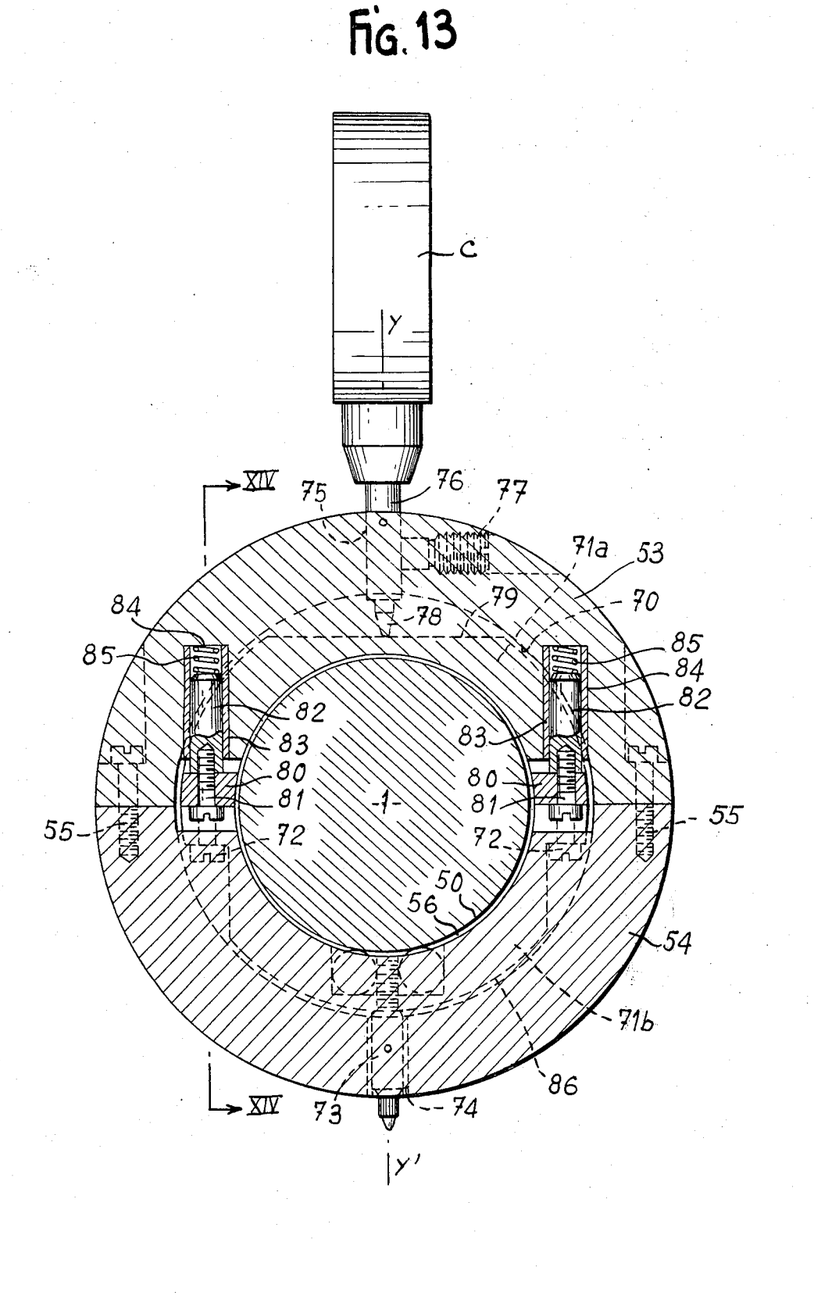

The ring is also provided with an internal groove 70 intended to receive a feeler unit comprising a small ring 71 housed integrally in the groove 70 and having an internal diameter substantially equal to that of the first ring.

The small ring 71 is also made-up of two half-portions 71a, 71b, fixed to each other by screws 72.

In one of the first half-portions (for instance 71b in the example shown) there is fixed, by screwing for example, a feeler 73 which extends radially towards the exterior passing through an orifice 74 formed in the portion 54 of the large ring; it is the point of this feeler which is intended to come into contact with the surface of the part to be checked.

Diametrically opposite to the feeler 73 there is mounted in an orifice 75 of the large ring, a rod 76 of a measuring instrument held in place by a screw 77. In the interior of this rod slides a second moving rod 78 urged into projection towards the axis of the bar by an elastic system and which is supported on a bearing surface 79 formed at the periphery of the portion 71a of the small ring. The moving rod 78, by its axial displacements causes the movement of a needle in front of the scale of the measuring instrument, this movement being caused by that of the small ring and indicating the differences of shape detected by the feeler 73 on the part to be checked.

The measuring instrument associated with the device may naturally be of any type. In the example shown there has simply been indicated a comparator C, but it will be understood that an electronic device could be employed. With a comparator, it is possible to detect variations of the order of 0.001 mm. and with an electronic instrument variations of the order of 0.0001 mm.

It will be understood that with this system it is absolutely necessary to prevent the small ring moving otherwise than along the diameter XX' determined by the feeler 73 and the rod 78, and there will therefore be provided a guide for the small ring in the large ring. To this end, the portion 71a of the small ring has two wings 80 to which are fixed by screws 81, guiding columns 82 extending parallel to the diameter XX' and sliding in tubular sockets 83 engaged in corresponding housings 84 of the portion 53 of the ring.

Between the bottom of the housings 84 and the base of the columns 82 extends a spring 85 which has a tendency to push back the small ring 71 into the maximum extended position of the feeler 73. This position corresponds to the state of rest of the measuring instrument, in which state the small ring makes contact by cylindrical bearing surfaces 86 located on each side of the feeler 73, against the internal face of the groove 70.

Thus, in this position of rest, the small ring 72 is eccentric with respect to the large ring and the bar.

When it is desired to use the apparatus, it must first be calibrated (re-set to zero). To do this, the apparatus is placed in the position of FIG. 10, supported by its cylindrical bearing surfaces 46 and 47 on a strictly flat reference surface R. The comparator is then adjusted in such manner that the pointer indicates zero, in which position the small ring 71 is preferably located strictly coaxial with the bar 1.

It will be understood that any variation then detected by the feeler during the checking of the part causes the movement of the small ring 71 which will transfer the information to the rod 78 and to the pointer of the measuring instrument.

Furthermore, it will be understood that apparatus could be provided of various lengths, which would eliminate any limitation in checking of height.

It may also be noted that, in the case where the apparatus is accidentally deformed, due for example to a fall, its design enables it to be put back into order with the same precision as it had originally. In fact, it is only necessary in this case to retouch the apparatus on a grinder, to treat again the faces 4 and 5, to grind the bearing surfaces 8–9 or 46–47 and to give the apparatus a fresh stabilization treatment.

This constitutes a certain additional advantage as compared with known types of precision apparatus, which are irremediably put out of use when they are subjected to deformation.

What I claim is:

1. An apparatus for checking machined parts, comprising: a rigid elongated body consisting of a bar and two end-plugs and being constructively made in one single piece; said bar having an external surface; said end-plugs being substantially identical with outer faces parallel to one another; said end-plugs having transverse cross-sections greater than the transverse cross-section of said bar; said identical end-plugs including, on each edge thereof, a supporting zone perpendicular to said outer faces and parallel to the longitudinal axis of said elongated body; a ring; measuring instrument means carried by said ring for measuring deviations from the plane defined by said supporting zones and including a probe with one extremity interposed between said supporting zones; said ring consisting of at least two detachably connected parts and having an internal surface of the same shape as said external surface of said bar for allowing the displacement of said ring axially along said bar; the internal dimensions of said ring being greater than the dimensions of the transverse section of said bar; said ring being provided with shoes having a low coefficient of friction, said shoes being interposed between said ring and said external surface of said bar.

2. An apparatus as claimed in claim 1, in which said ring comprises fixed but removable shoes and at least one radially movable shoe acted upon by a spring system so as to be urged towards the axis of said ring.

3. An apparatus as claimed in claim 2, in which said spring system is associated with a regulating means enabling the force of application of said shoe against said bar to be modified.

4. An apparatus for checking machined parts, comprising: a rigid elongated body consisting of a bar and two end-plugs and being constructively made in one single piece; said bar having an external surface; said end-plugs being substantially identical with outer faces parallel to one another; said end-plugs having transverse cross-sections greater than the transverse cross-section of said bar; said identical end-plugs including, on each edge thereof, a supporting zone perpendicular to said outer faces and parallel to the longitudinal axis of said elongated body; a ring; measuring instrument means carried by said ring for measuring deviations from the plane defined by said supporting zones and including a probe with one extremity interposed between said supporting zones; said ring consisting of at least two detachably connected parts and having an internal surface of the same shape as said external surface of said bar for allowing the displacement of said ring axially along said bar; the internal dimensions of said ring being greater than the transverse section of said bar; said ring being provided with shoes interposed between said ring and the external surface of said bar; said ring being provided with an annular internal groove in which is housed a second ring of the same internal dimensions as said first ring and mounted in said first ring in such a manner as to be movable radially, said second ring being fixed against rotation with respect to said first ring, said second ring further carrying said probe and being operatively connected to said measuring instrument means.

5. An apparatus as claimed in claim 4, in which said probe comprises a feeler extending radially towards the exterior of said first ring through a first orifice in said first ring, said feeler being aligned with the rod of a measuring instrument fixed radially in a second orifice diametrically opposite to said first orifice, the rod of said measuring instrument being in operative engagement with the outer surface of said second ring.

6. An apparatus as claimed in claim 5, in which said second ring is provided with two guiding columns adapted to slide in bores formed in said first ring, said guiding columns being parallel to the axis determined by said feeler and the rod of said measuring instrument.

7. An apparatus as claimed in claim 6, in which, between the bottom of each bore and its associated guiding column is arranged a spring adapted to urge said second ring in a radial direction with respect to said first ring.

8. An apparatus as claimed in claim 5, in which said second ring is urged in a direction such that said feeler projects to the maximum extent towards the exterior of the orifice of the first ring in which it is adapted to slide.

9. An apparatus as claimed in claim 4, in which said second ring is made in the form of two complementary half-shells, fixed to each other after assembly on said bar.

* * * * *